United States Patent
Mudd et al.

(10) Patent No.: US 7,281,859 B2
(45) Date of Patent: Oct. 16, 2007

(54) OPTICAL FIBER CONNECTOR AND METHOD OF ASSEMBLY

(75) Inventors: Ronald L. Mudd, Euless, TX (US); Derek N. Johnson, Lansing, MI (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/642,400

(22) Filed: Dec. 20, 2006

(65) Prior Publication Data
US 2007/0098331 A1 May 3, 2007

Related U.S. Application Data

(63) Continuation of application No. 10/998,438, filed on Nov. 29, 2004, now abandoned.

(51) Int. Cl.
*G02B 6/36* (2006.01)
(52) U.S. Cl. .............. 385/76; 385/53; 385/77; 385/78; 385/60; 385/81; 385/65; 385/66; 385/83; 385/84; 385/88
(58) Field of Classification Search .......... 385/53–56, 385/60, 62, 65–66, 69–72, 81, 76–78, 86
See application file for complete search history.

(56) References Cited

U.S. PATENT DOCUMENTS

| | | | |
|---|---|---|---|
| 4,718,745 A * | 1/1988 | Strait, Jr. ............. 385/64 |
| 4,762,389 A * | 8/1988 | Kaihara ............. 385/60 |
| 5,809,192 A * | 9/1998 | Manning et al. ........ 385/78 |
| 6,022,150 A * | 2/2000 | Erdman et al. ........ 385/81 |
| 6,062,739 A * | 5/2000 | Blake et al. .......... 385/76 |
| 6,758,601 B2 | 7/2004 | Holmquist ........... 385/75 |
| 6,789,954 B2 | 9/2004 | Lampert et al. ....... 385/78 |
| 2004/0101254 A1 | 5/2004 | Erdman et al. ........ 385/78 |
| 2004/0105625 A1 | 6/2004 | Ueda et al. ........... 385/78 |
| 2004/0131316 A1 | 7/2004 | Manning et al. ....... 385/78 |
| 2004/0131317 A1* | 7/2004 | Grzegorzewska et al. .... 385/86 |
| 2004/0165832 A1 | 8/2004 | Bates, III et al. ...... 385/76 |
| 2005/0084215 A1* | 4/2005 | Grzegorzewska et al. .... 385/60 |

* cited by examiner

*Primary Examiner*—Frank G. Font
*Assistant Examiner*—Guy G Anderson
(74) *Attorney, Agent, or Firm*—Keith A. Roberson

(57) ABSTRACT

A method for assembling an optical fiber connector comprising providing a one piece housing comprising a tailpiece and a body defining a forward first end, a rearward second end and a passage extending longitudinally therebetween, inserting a spring element into the passage through the forward first end, inserting a subassembly comprising a ferrule, a ferrule holder and a lead-in tube into the passage through the forward first end, maintaining the spring within the passage between a shoulder defined by the one piece housing and a flange of the ferrule holder, and inserting a subassembly retainer into the passage through the forward first end.

14 Claims, 17 Drawing Sheets

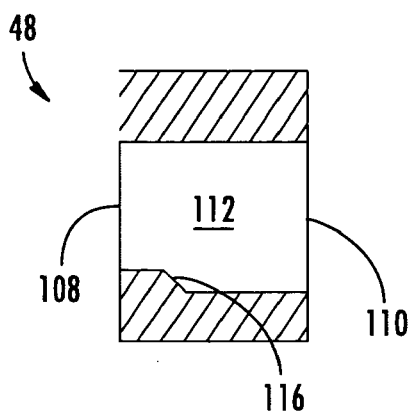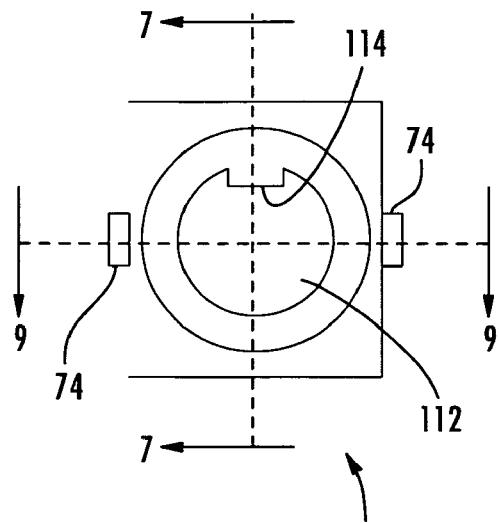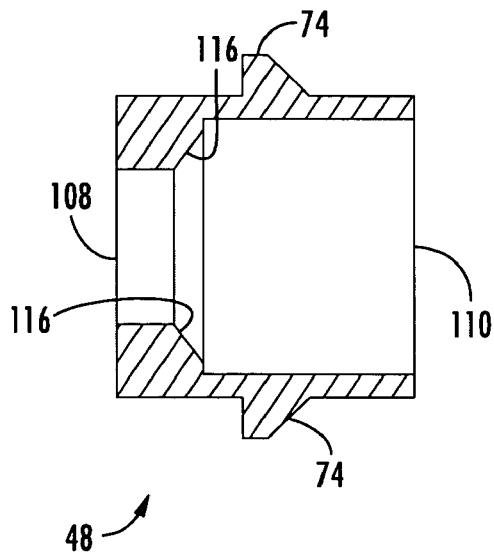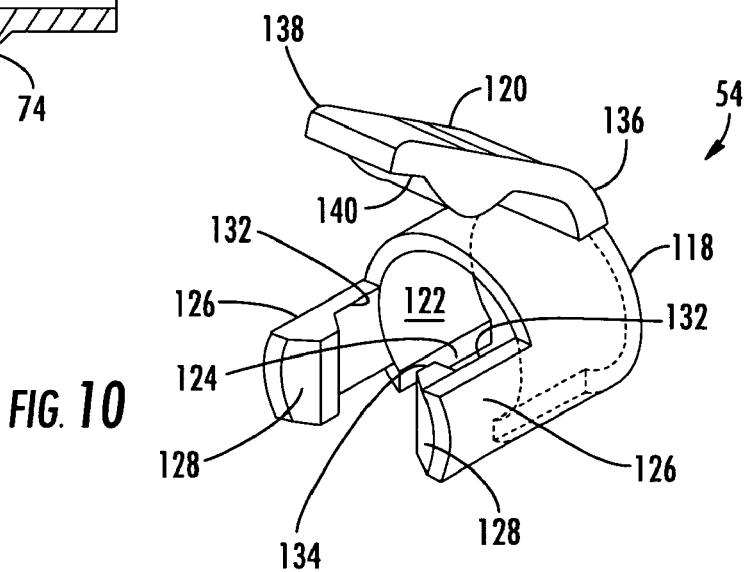
FIG. 7
FIG. 8
FIG. 9
FIG. 10

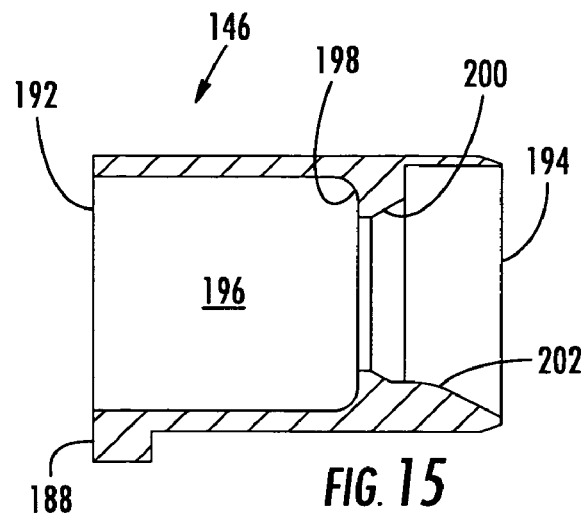
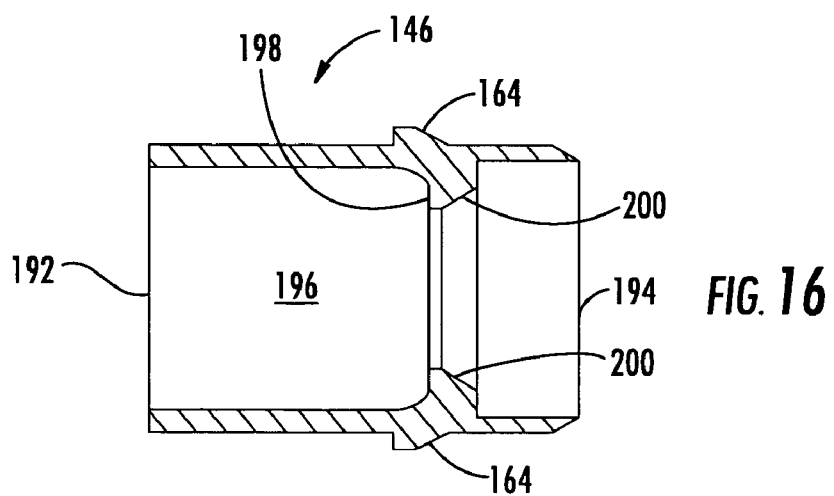
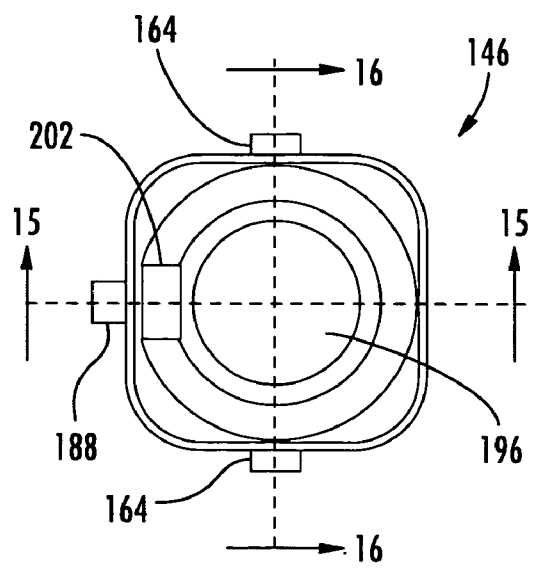

OPTICAL FIBER CONNECTOR AND METHOD OF ASSEMBLY

CROSS-REFERENCE TO RELATED APPLICATIONS

This application is a Continuation of U.S. patent application Ser. No. 10/998,438 filed Nov. 29, 2004 now abandoned and entitled "Optical Fiber Connector", the contents of which are hereby incorporated by reference.

BACKGROUND OF THE INVENTION

1. Field of the Invention

The invention relates generally to an optical fiber connector, and more particularly to an optical fiber connector having a one-piece housing.

2. Technical Background

Optical fibers are widely used in a variety of applications, including the telecommunications industry in which optical fibers are employed in a number of telephony and data transmission applications. Due, at least in part, to the extremely wide bandwidth and the low noise operation provided by optical fibers, the use of optical fibers and the variety of applications in which optical fibers are used are continuing to increase. For example, optical fibers no longer serve as merely a medium for long distance signal transmission, but are being increasingly routed directly to the home or, in some instances, directly to a desk or other work location.

With the ever increasing and varied use of optical fibers, it is apparent that efficient methods of coupling optical fibers, such as to other optical fibers, to a patch panel in a telephone central office or in an office building or to various remote terminals or pedestals, is required. However, in order to efficiently couple the signals transmitted by the respective optical fibers, an optical fiber connector must not significantly attenuate or alter the transmitted signals. In addition, the optical fiber connector must be relatively rugged and adapted to be connected and disconnected a number of times in order to accommodate changes in the optical fiber transmission path.

In order to prevent degradation in the transmission properties of optical fibers which have been connected through the use of optical fiber connectors, manufacturers typically provide for strain and bend relief of the optical fiber or fibers disposed within the connector. In particular, strain relief may be accomplished by securing a portion of the optical fiber and/or optical cable containing the optical fiber to the connector assembly. One method is by clamping a suitable portion of the connector assembly to the coated optical fiber itself. Another method involves clamping strength members contained within an optical fiber cable assembly to the connector. Either or both approaches may be used.

Because of their reduced footprint, small-form factor connectors, such as so-called LC design connectors, have employed a separate attachment member which is assembled to the connector body to provide the necessary strain relief. An example of a prior art LC connector having a separable attachment member is shown in FIG. 1. When an optical fiber which has been connectorized with an optical fiber connector having a separable attachment member is stressed at an angle other than along the axis of the optical fiber disposed within the connector, the point at which the attachment member is joined to the rest of the connector assembly may be overstressed. If the stress angle is large enough, the high stress level at the attachment member/housing joint may cause the joint to fail and the attachment member to separate from the rest of the connector assembly. The failure of the attachment member may degrade the transmission performance of the optical fiber, or in the worst case, cause the optical fiber to fail altogether. Consequently, what is need is an optical fiber connector wherein the attachment member is an integral part of the connector housing. Such a connector should be constructed so as to maintain as small a form as possible.

SUMMARY OF THE INVENTION

In one broad aspect, an optical fiber connector according to one embodiment of the invention comprises a one piece housing having a body and a tailpiece. The tailpiece extends rearward from the body, and a passage extends through the housing between a forward first end and a rearward second end.

According to the present embodiment, a subassembly comprising a ferrule holder, a ferrule and a lead-in tube, the ferrule and the lead-in tube are disposed within the ferrule holder and the subassembly is inserted into the housing passage through the housing first end. A spring element is disposed between a shoulder within the housing passage and a flange on the ferrule holder and a retainer is inserted into the housing passage through the housing first end for retaining the subassembly within the housing. Preferably, the optical fiber connector housing further comprises a latching arm for latching the optical fiber connector to an optical fiber connector adapter or other piece of optical fiber hardware. The insertion of such components as the subassembly, spring element and retainer into the housing passage through the forward, first end of the housing advantageously permits the optical fiber connector of the present invention to exhibit a very small form.

The optical fiber connector according to the present embodiment preferably further comprising a trigger member. The trigger member, for example, may minimize snagging of the connector latching arm when the connectorized optical fiber is pulled in a backward direction, and is intended to ease operation of the latching arm. The trigger member latching arms preferably engage with recesses on the housing body. A clamping element may be used to secure strength members which may be associated with an optical fiber to which the optical fiber connector may be attached.

Preferably, the retainer includes latching elements which extend from an outside surface of the retainer for securing the retainer within the housing passage. Complimentary channels within the housing passage receive the latching elements and allow the latching elements to slide into the passage without obstruction. In a preferred embodiment, the latching elements snap over snap ridges within the housing passage, and are thereafter engaged with latch openings within the housing, thus securing the retainer within the connector housing.

A lead-in tube for guiding an optical fiber into the ferrule is preferably disposed substantially within the housing. The lead-in tube may have a flare formed at one end thereof for guiding an optical fiber into the connector. The lead-in tube may be secured within the ferrule holder with an adhesive, such as an epoxy adhesive, or the lead-in tube may be press-fit or snap fit. Other methods may also be used to secure the lead-in tube within the ferrule holder as are known within the art without departing from the scope of the invention.

According to the present embodiment of the invention, the ferrule holder may include a flange. The flange preferably also has a keyway for slidably engaging with a key within the retainer for providing correct orientation of the ferrule holder within the retainer. Alternatively, the key and keyway may be reversed, with the key located on the ferrule holder and the keyway disposed within the retainer. Preferably, the ferrule holder includes a generally conical portion. The conical portion may be used to provide self-centering capability for the ferrule holder within the retainer.

When assembled, the spring element preferably biases the ferrule holder against the retainer with a predetermined spring force. Preferably, the predetermined spring force is greater than about 1 lb.; more preferably between about 1 lb. and 1.5 lbs.; and most preferably between about 1.1 lb. and 1.4 lbs.

In accordance with one embodiment, the optical fiber connector retainer comprises a key for slidably engaging with a corresponding keyway at the first end of the housing into which the retainer is inserted. In another embodiment, the retainer comprises a flange at one end thereof, the flange abutting the forward first end of the connector housing. Preferably the optical fiber connector flange comprises an alignment feature -for aligning the retainer within the housing passage. The alignment feature may be a portion of the flange with a different dimension than the remainder of the flange, such as a truncated flange. For example, the alignment feature of the flange may extend a shorter distance from the retainer than the other portions of the flange, or the alignment feature may be a different shape than the other portions of the flange. Alternatively, alignment of the retainer within the housing passage may be accomplished by the absence of a portion of the flange. Preferably, the optical fiber connector housing includes a lip which cooperates with the retainer flange alignment feature to align the retainer within the housing.

In accordance with the present embodiment, the retainer includes a stop within an internal passage, the stop serving to prevent passage of the ferrule holder through the retainer. The stop preferably includes a tapered or sloped portion for assisting in the centering of the ferrule holder within the retainer.

In another broad aspect of the present invention, an optical fiber connector is provided comprising a housing having a forward first end and a rearward second end and a passage therebetween. The optical fiber connector according to the present embodiment includes a subassembly disposed within the housing. The subassembly comprises a ferrule holder, a lead-in tube, a spring element disposed between a shoulder within the housing passage and a flange on the ferrule holder, a retainer inserted into the housing passage through the housing first end for retaining the subassembly within the housing and the spring element biases the ferrule holder against the retainer with a predetermined spring force. The predetermined spring force is preferably greater than about 1 lb.; more preferably between about 1 lb. and 1.5 lbs.; and most preferably between about 1.1 lb. and 1.4 lbs.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate the various exemplary embodiments of the invention, and together with the description serve to explain the principles and operations of the invention.

BRIEF DESCRIPTION OF THE DRAWINGS

FIG. 7 is a longitudinal cross sectional view of a retainer according to an embodiment of the present invention.

FIG. 8 is a front view of the retainer of FIG. 7.

FIG. 9 is another longitudinal cross sectional view of the retainer of FIG. 7.

FIG. 10 is a perspective view of a trigger member according to an embodiment of the present invention.

FIG. 11 is an exploded view of an optical fiber connector according to another embodiment of the present invention.

FIG. 15 is longitudinal cross sectional view of another embodiment of a retainer according to the present invention.

FIG. 16 is another longitudinal cross sectional view of the retainer of FIG. 15.

DETAILED DESCRIPTION OF THE INVENTION

Figure 1:
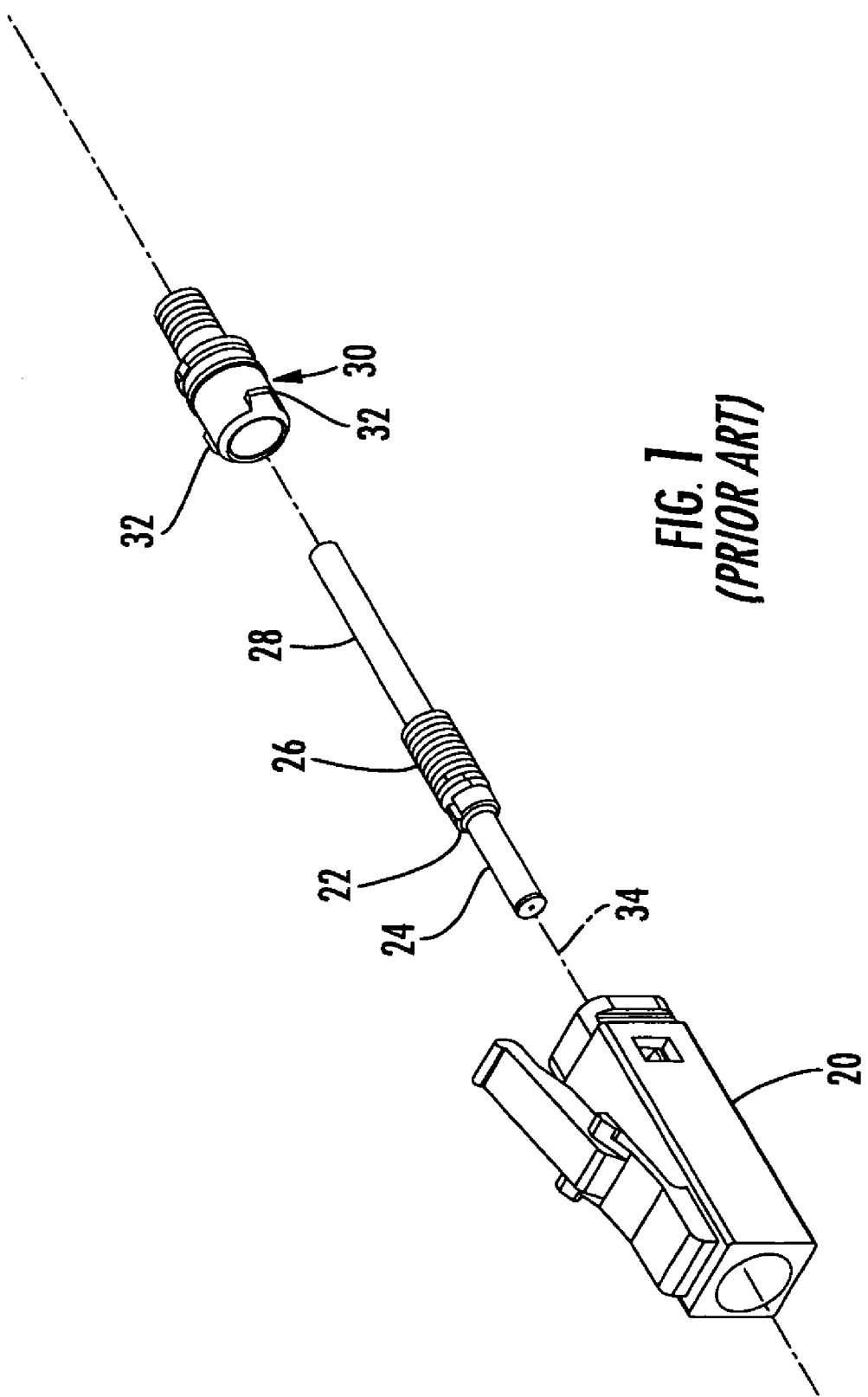
FIG. 1 depicts a partially exploded view of a prior art connector having a separable attachment member.

FIG. 1 depicts a prior art LC connector comprising, inter alia, a housing 20, a ferrule holder 22 having a ferrule 24 disposed within the ferrule holder, a spring 26, a lead-in tube 28 and a separate attachment member 30. The prior art connector of FIG. 1 is assembled by inserting ferrule holder 22 (including ferrule 24 and lead-in tube 28) and spring 26 through the rear of housing 20 and thereafter inserting attachment member 30, also through the rear of housing 20, until latching members 32 on attachment member 30 engage with corresponding openings in the housing. Attachment member 30 serves both to retain the ferrule holder within housing 20, and as a seat for spring 26, wherein the spring is seated against the attachment member and biases ferrule holder 22 forward. Attachment member 30 also provides a point of attachment for strength members which may accompany an optical fiber cable. Prior art connectors such as the connector illustrated in FIG. 1 suffer from a weakness at the point where the attachment member 30 engages with the housing 20. In a completely assembled connector having an optical fiber and/or optical fiber cable disposed therein, tension on the optical fiber and/or cable at a sharp angle with respect to the longitudinal axis 34 of the connector, such as, for example, 90 degrees from the longitudinal axis of the connector, may cause the attachment member 30 to disengage from the connector housing 20. Disengagement of the attachment member 30 from the housing 20 may result in degradation to the bend resistance afforded to the optical fiber by the attachment member as well as possible damage to the optical fiber. Moreover, disengagement of attachment member 30 from housing 20 may free internal components 22, 24 and 28 and lead to overall mechanical failure of the connector.

Figure 2:
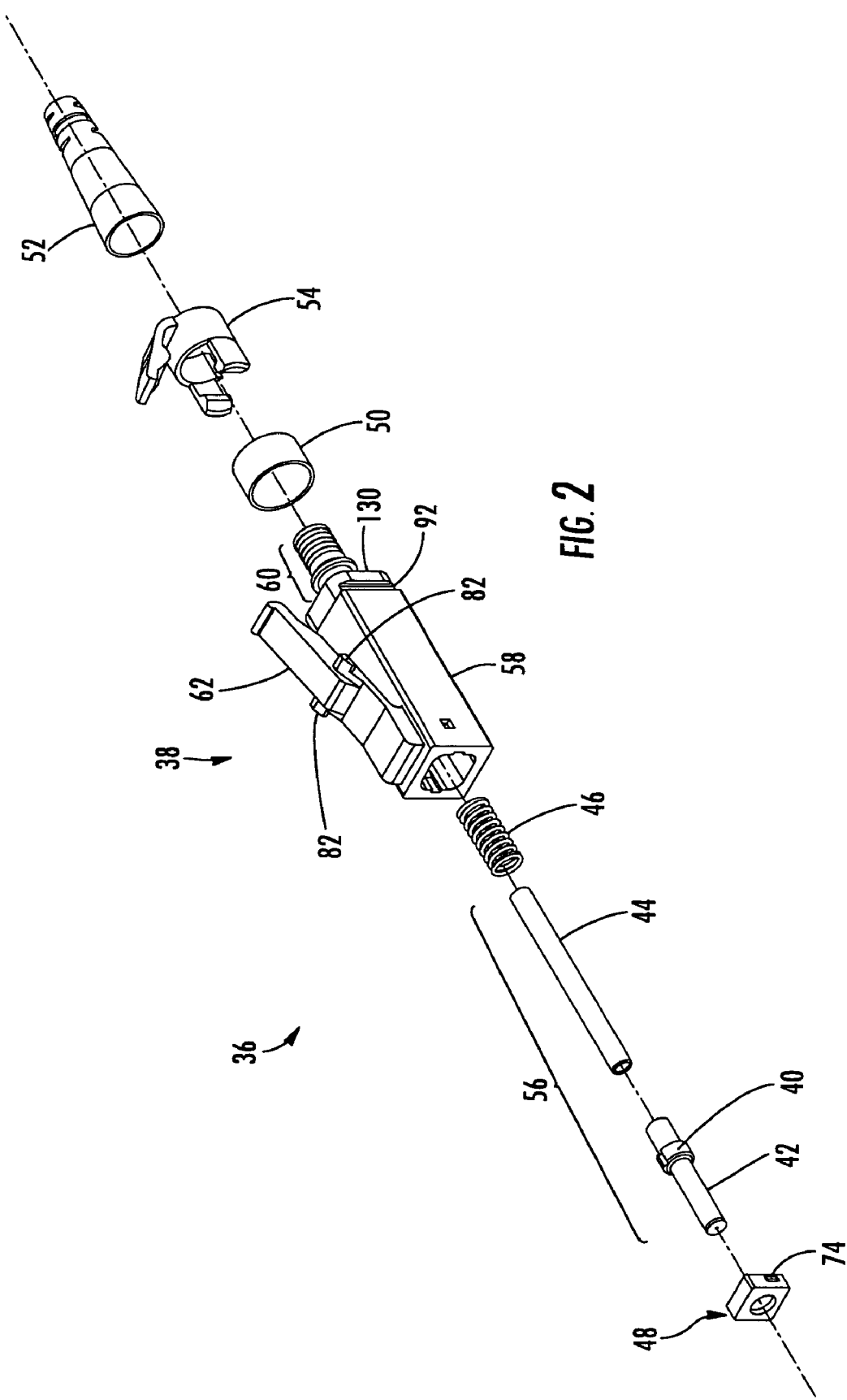
FIG. 2 is an exploded view of an embodiment of an optical fiber connector according to the present invention.

FIG. 2 is a partially exploded view of an embodiment of a connector according to the present invention, generally indicated by reference 36, comprising single-piece housing 38, ferrule holder 40, ferrule 42, lead-in tube 44, spring element 46 and retainer 48. Connector 36 may further include crimp ring 50, boot 52 and trigger member 54. Ferrule holder 40, ferrule 42 and lead-in tube 44 comprise subassembly 56.

Figure 3:
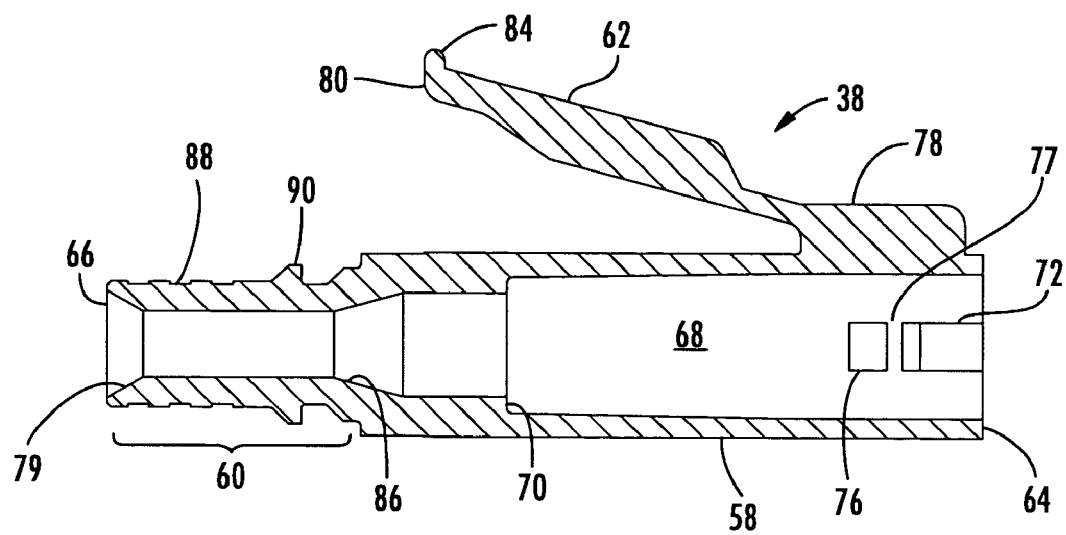
FIG. 3 is a longitudinal cross sectional view of a one-piece housing according to the embodiment of FIG. 2.

Housing 38 is characterized by housing body 58, housing tailpiece 60 and latching arm 62. Housing 38 is formed in a single piece, for example, by injection molding, and may be comprised of a plastic or other suitable moldable material. As best shown by FIG. 3, housing 38 includes forward first end 64, rearward second end 66, and passage 68 extending therebetween.

Housing passage 68 preferably contains shoulder 70 located at an intermediate position within the passage. Shoulder 70 serves as a seat for seating and positioning spring element 46 within housing passage 68. Spring element 46 is preferably a coil spring. Housing passage 68 may also include at least one channel 72 extending longitudinally along an inside surface thereof and along at least a portion of passage 68 to accommodate at least one retainer latching element 74 (FIG. 2) which may be used to secure retainer 48 within the housing. Latching element 74 slides within channel 72 as retainer 48 is inserted through housing first end 64 into housing passage 68 until latching element 74 engages with latch opening 76 in housing body 58. Preferably, there are at least two latching elements on retainer 48 located on opposing sides of retainer 48, and two corresponding channels 72 and two corresponding latch openings 76 in housing body 58. Housing 38 may further comprise snap ridges 77 between channels 72 and latch openings 76. Thus, latching elements 74 snap over snap ridges 77 before the latching elements engage with openings 76.

Figure 4:
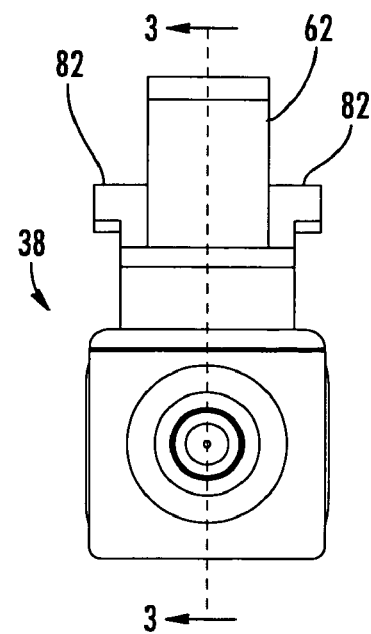
FIG. 4 is front view of the optical fiber connector of FIG. 2 showing the latching lugs.

Housing latching arm 62 comprises proximal end 78 attached to housing body 58 and a cantilevered distal end 80 which projects from housing body 58. Latching arm 62 also includes latching lugs 82, best seen in FIG. 4, for securing housing 38, and therefore assembled connector 36, within an adapter (for mating the connector to another connector), or to a fiber optic module. Preferably, latching lugs 82 extend outward from latching arm 62 at an intermediate position between proximal end 78 and distal end 80. Latching arm distal end 80 may include latching arm lip 84 for cooperating with trigger member 54. Latching arm 62 is sufficiently resilient that the latching arm may be depressed, thereby deflecting distal end 80 toward housing body 58. When latching arm 62 is released from a depressed position, latching arm 62 preferably returns to its previous, undepressed position.

Housing tailpiece 60 extends rearward from housing body 58 and terminates at housing second end 66. Housing tailpiece 60 is preferably cylindrical, and that portion of housing passage 68 extending through tailpiece 60 is sized to receive lead-in tube 44. Preferably, at least a portion 86 of passage 68 is tapered so as to facilitate insertion of lead-in tube 44 without damage to the lead-in tube. A chamfer 79 about the inside circumference of passage 68 at tailpiece second end 66 may be included to accommodate a flare at one end of lead-in tube 44.

Housing tailpiece 60 may further include surface gripping features, such as grooves 88, for retaining strength members of an optical cable, such as arimid yarns. In the event connector 36 is to be attached to an optical fiber contained within a cable structure comprising appropriate strength members, the strength members may be exposed by removing a portion of the cable jacket. The strength members are then placed over the gripping features of housing tailpiece 60 and a clamping element, such as crimp ring 50, is crimped about housing tailpiece 60, thereby capturing the strength members between the tailpiece and the clamping element. The gripping features effectively increase the surface area of the tailpiece 60 beneath the clamping element 50, and aid in attaching the strength members to housing 38. Although the gripping features depicted in FIG. 3 comprise grooves, the gripping features may be other surface features such as, for example, ridges or dimples.

Tailpiece 60 may also comprise ridge 90 for retaining boot 52. When boot 52 is mounted on housing 38, such as by inserting tailpiece 60 into boot 52, ridge 90 preferably mates with a corresponding groove (not shown) in boot 52, thereby securing boot 52 onto housing 38. One skilled in the art will realize that other complimentary mating features may be used, such as concave and convex forms. The location of ridge 90 and a complimentary groove within boot 52 may also be reversed.

Figure 5:
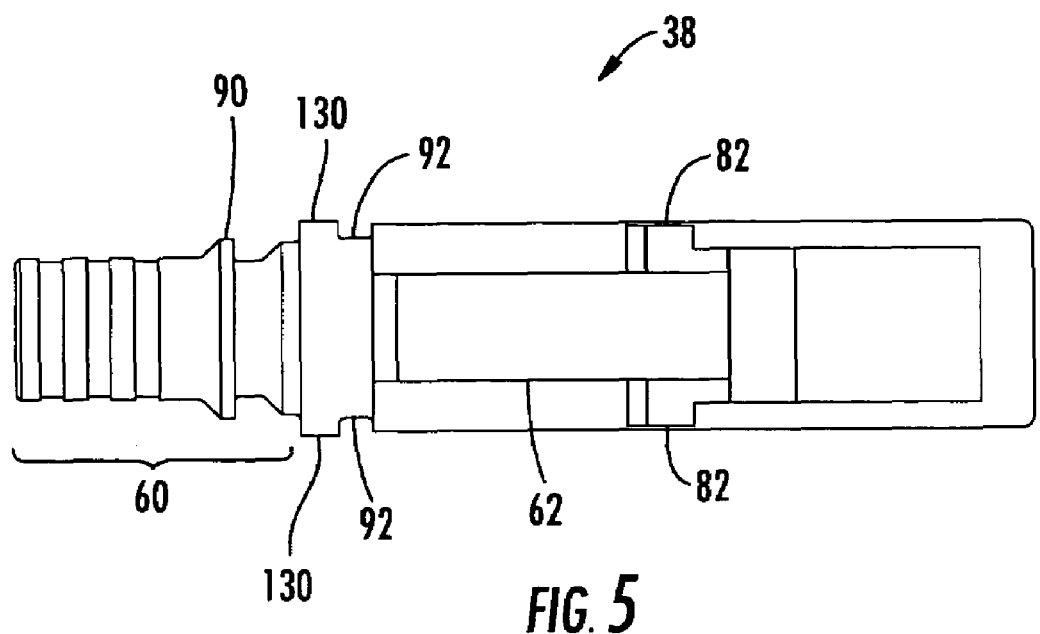
FIG. 5 is a top view of the optical fiber connector housing of FIG. 3 depicting the recesses for securing a trigger member.

Housing body 58 may preferably also comprise recesses 92, best shown in a top down view of housing 38 depicted in FIG. 5, located proximate tailpiece 60 for engaging with optional trigger member 54 (FIG. 2). Trigger member 54 is described more fully below.

Figure 6:
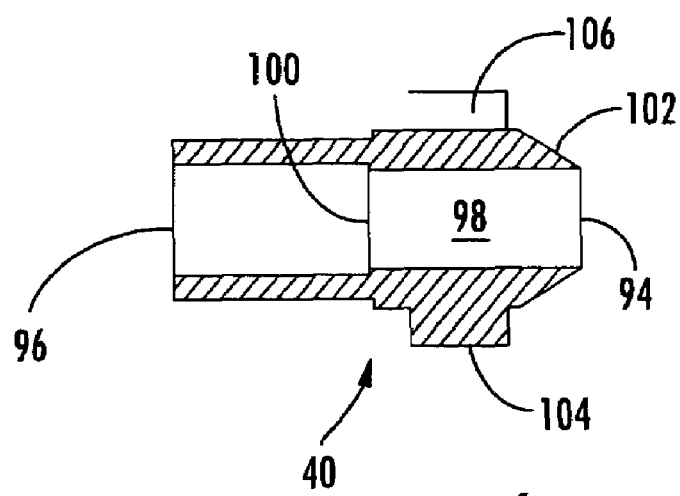
FIG. 6 is a longitudinal cross sectional view of a ferrule holder according to an embodiment of the present invention.

Ferrule holder 40, shown in FIG. 6, comprises first end 94, and second end 96 and a passage 98 extending therebetween. Ferrule holder passage 98 may be enlarged at one end, such as proximate second end 96, thereby forming shoulder 100 at an intermediate position within the passage. The enlarged portion of ferrule holder passage 98 facilitates insertion of one end of lead-in tube 44 into ferrule holder passage 98 through ferrule holder second end 96, the enlarged portion of ferrule holder passage 98 being sized to receive lead-in tube 44. Shoulder 100 serves as a positive stop for lead-in tube 44. Lead-in tube 44 may be retained within ferrule holder 40, for example, by a friction fit, a snap fit or, alternatively, lead-in tube 44 may be retained within ferrule holder 40 via an adhesive, such as an epoxy adhesive.

It is preferable that an outside surface of ferrule holder 40 proximate first end 94 has a generally conical shaped portion 102 to encourage centering of the ferrule holder within retainer 48. Ferrule holder 40 also includes flange 104 preferably located rearward of conical portion 102. Preferably, flange 104 has a groove or keyway 106 extending longitudinally through the flange. Keyway 106 slidably engages with a cooperating key within the retainer. Alternatively, the position of the key and keyway may be reversed, with the key positioned on ferrule holder flange 104 and the keyway located within retainer 48.

Ferrule 42 is inserted into ferrule holder passage 98 through ferrule holder first end 94 and terminates at an intermediate position within passage 98 forward of lead-in tube 44. Ferrule 42 is typically comprised of a ceramic, but may be formed from any suitable material such as glass, metal or plastic. Ferrule 42 is preferably cylindrical and has a bore extending therethrough in which an optical fiber may be disposed. Ferrule 42 may be retained within ferrule holder 40 by a friction fit, or, alternatively, ferrule 42 may be retained via an adhesive, such as an epoxy adhesive.

Lead-in tube 44 is inserted into ferrule holder passage 98 through ferrule holder second end 96, and may be retained in ferrule holder 40 by a resistance fit, by an adhesive, such as an epoxy adhesive, or by other means as are known in the art. After lead-in tube 44 has been disposed within housing 38, one end of lead-in tube 44 may be flared to aid in guiding an optical fiber into the ferrule 42. The flare may be formed by heating the rearward end of lead-in tube 44 and enlarging or otherwise shaping the heated end. Consequently, it is desirable that lead-in tube 44 be comprised of a readily deformable material, preferably a plastic which may be deformed with the application of heat and a suitable form which may be inserted into the heated portion of the tube to shape the tube end. The flare may be formed by methods known in the art, such as heating the exposed portion of lead-in tube 44 at housing end 66 and inserting a suitable form into the lead-in tube, such as a conical form, to flare the heated end of the tube. The form may serve both to heat and to flare the lead-in tube 44. Chamfer 79 within housing passage 68 accommodates the lead-in tube flare.

As depicted in FIGS. 7-9, retainer 48 comprises first end 108, second end 110 and a passage 112 extending therebetween. Retainer 48 preferably has an outer surface generally complimentary in shape to the shape of that portion of housing passage 68 into which the retainer is inserted, such as, for example, a square. However, retainer 48 may have other shapes, such as circular or oval, for example, as long as retainer 48 fits within housing passage 68 at housing first end 64.

As previously mentioned, and as depicted in FIGS. 8-9, retainer 48 preferably has at least one latching element 74 extending from an outside surface of the retainer body for engaging with latching openings 76 in housing body 58. Preferably, retainer 48 comprises at least two latching elements 74 generally located opposite each other on the retainer. Latching elements 74 preferably have a first face which extends generally perpendicular to a side of the retainer to which it is attached, and a sloping second face opposite the first face which facilitates insertion of the latching element into latching opening 76. Thus, the sloping face of the latching element eases insertion of the latching element into latch opening 76, and more particularly, past snap ridges 77, while the generally perpendicular face resists removal of the retainer once it is in an engaged relationship with the latch opening.

In accordance with the present embodiment, retainer 48 further comprises key 114 for slidably engaging with ferrule holder keyway 106. Sloping portion 116 advantageously cooperates with ferrule holder conical portion 102 for centering ferrule holder 40 relative to retainer 48.

Connector 36 may be assembled in the following manner: Spring element 46 is inserted into passage 68 through housing first end 64 and into abutment with housing shoulder 70. Ferrule 42 is inserted through ferrule holder first end 94 into passage 98 and secured, such as with an adhesive. Lead-in tube 44 may then be inserted into ferrule holder passage 98 through ferrule holder second end 96, and preferably pressed into abutment with shoulder 100 in ferrule holder passage 98. Subassembly 56, comprising ferrule holder 40, ferrule 42 and lead-in tube 44 is mounted in housing 38 by inserting the subassembly into housing passage 68 through housing first end 64 such that lead-in tube 44 passes through a central region of spring element 46 and housing tailpiece 60.

Once subassembly 56 has been mounted within housing 38, retainer 48 is inserted into housing passage 68 through housing first end 64 until ferrule holder conical portion 102 abuts an inside surface of retainer 48, preferably sloping portion 116. Retainer 48 is orientated such that retainer latching elements 74 slidably engage with channels 72 in housing passage 68. Retainer 48 is pushed rearward into housing passage 68, causing ferrule holder flange 104 to compress spring element 46 until retainer latching elements 74 snap over ridges 77 and engage with housing latch openings 76, thereby placing subassembly 56 in a floating relationship with housing 38. Spring element 46 is captured and compressed between housing shoulder 70 and ferrule holder flange 104, and biases ferrule holder 40 against retainer 48 with a predetermined spring force. The predetermined spring force is preferably greater than about 1 lb.; more preferably between about 1 lb. and 1.5 lbs.; and most preferably between about 1.1 lb. and 1.4 lbs. It should be noted that retainer 48 may be secured within housing passage 68 by other means as are known in the art, such as by a friction fit, or through the use of adhesives, such as an epoxy adhesive. That portion of lead-in tube 44 exposed at housing second end 66 after retainer 48 is secured into place within housing 38 may then be flared by methods which are known to the skilled artisan, such has by inserting a heated form into the bore of lead-in tube 44 and enlarging a portion of the lead-in tube to form a flare. The flare eases and guides insertion of an optical fiber into and through lead-in tube 44 and into ferrule 42. Subassembly 56 thereby floats within housing passage 68 and is biased forward by spring element 46, but is prevented from being expelled from housing 38 by retainer 48.

As broadly shown in FIG. 2, optional trigger member 54 may be removably attached to housing 38. Trigger member 54, shown in detail in FIG. 10, includes first element 118 and second element 120. Trigger member 54 is removably attached to housing 38 via first element 118. First element 118 preferably defines a longitudinally-extending opening 122 configured for receiving boot 52 and permitting trigger member 54 to be snapped over boot 52 to thereby attach trigger member 54 to boot 52. More particularly, opening 122 is configured for permitting trigger member 54 to be radially snapped onto boot 52. Accordingly, a slot 124 is provided in first element 118. Slot 124 should be wide enough to allow boot 52 to pass though the slot. First element 118 may thus be substantially C-shaped to snugly fit on boot 52. Although not illustrated, if boot 52 was a shape other than cylindrical (e.g., square, rectangular, etc., in cross-section), then trigger member 54, and/or opening 122, would have a complimentary configuration.

Mating attachment elements are provided respectively on first element 118 for releasably attaching and axially securing trigger first element 118 to housing body 58. Preferably, the mating attachment elements comprise snap members 126 on trigger member 54 and recesses 92 in housing body 58. The locations of trigger snap members 126 and recesses 92 could be switched. Snap members 126 may include chamfered edges 128 to allow trigger member 54 to be more easily snapped to housing body 58. The mating attachment elements may alternately have other complimentary shapes, such as ridges, dimples, arcs, spherical sections, etc., within the scope of the invention.

Mating alignment elements are also provided for rotationally securing trigger first element 118 relative to housing 38. The alignment elements may comprise any variety of non-circumferential surfaces that interferingly prevent substantial rotation of trigger member 54 relative to housing 38. The alignment elements may comprise for example, planar surfaces 130 and 132, as shown in FIGS. 5 and 10, that contact each other when trigger member 54 is attached to housing 38. As shown, alignment elements 130 are on housing body 58 and alignment elements 132 are on snap members 126. Alternately, the alignment elements may comprise planar surfaces 134 at the ends of snap members 126 and corresponding planar surfaces at the bottom of recesses 92. Also, the alignment elements could have shapes other than planar, such as oblong, oval, irregular, etc., and be within the scope of the invention. When the alignment elements are aligned, trigger second element 120 is also aligned with latching arm 62 (unless trigger member 54 has been installed upside down). If desired, the attachment elements and alignment elements could be configured so that inadvertent misaligned attachment of trigger member 54 to housing body 58 is difficult or impossible, for example by making the attachment or alignment elements nonsymmetrical or irregular in some way.

Second element 120 of trigger member 54 has a proximal end 136 attached to first element 118 and a distal end 138 extending from the first element. Second element 120 provides at least two functions. The first function provided is that second element 120 is pivotable, as is latching arm 62, and second element 120 engages the latching arm to pivot the latching arm downward. The engagement between second element 120 and latching arm 62 moves distal end 80 of latching arm 62 downward to selectably release housing 38 from a receptacle, for example. Second element 120 has a contoured surface 140 for contacting lip 84 of latching arm 62 and assisting in pivoting latching arm 62 downward when second element 120 is depressed. The second function provided is that if an optical fiber cable to which connector 36 is attached is pulled backwardly, second element 120 reduces the possibility of latching arm 62 snagging on other cables, corners, or other fixtures along the routing path, as the second element extends at an acute angle toward and beyond latching arm lip 84. Preferably, trigger member first and second elements 118, 120 are comprised of a suitable plastic material and are molded in one piece therefrom.

When subassembly 56, spring element 46 and retainer 48 have been assembled into housing 38, and boot 52 has been mounted onto housing 38, trigger member 54 may be mounted onto boot 52 such that snap members 126 engage with corresponding recesses 92 on housing body 58. The engagement of snap members 126 with recesses 92 prevent trigger member 54 from rotating on boot 52 and maintain second element 120 in alignment with latching arm 62.

FIG. 11 illustrates another embodiment of the present invention wherein the connector housing comprises an alignment feature for cooperating with a corresponding alignment feature on the retainer. Similar to the previous embodiment and as shown in FIG. 11, connector 142 comprises housing 144, ferrule holder 40, ferrule 42, lead-in tube 44, spring element 46 and retainer 146. As described above, ferrule holder 40, ferrule 42 and lead-in tube 44 comprise subassembly 56.

Figure 12:
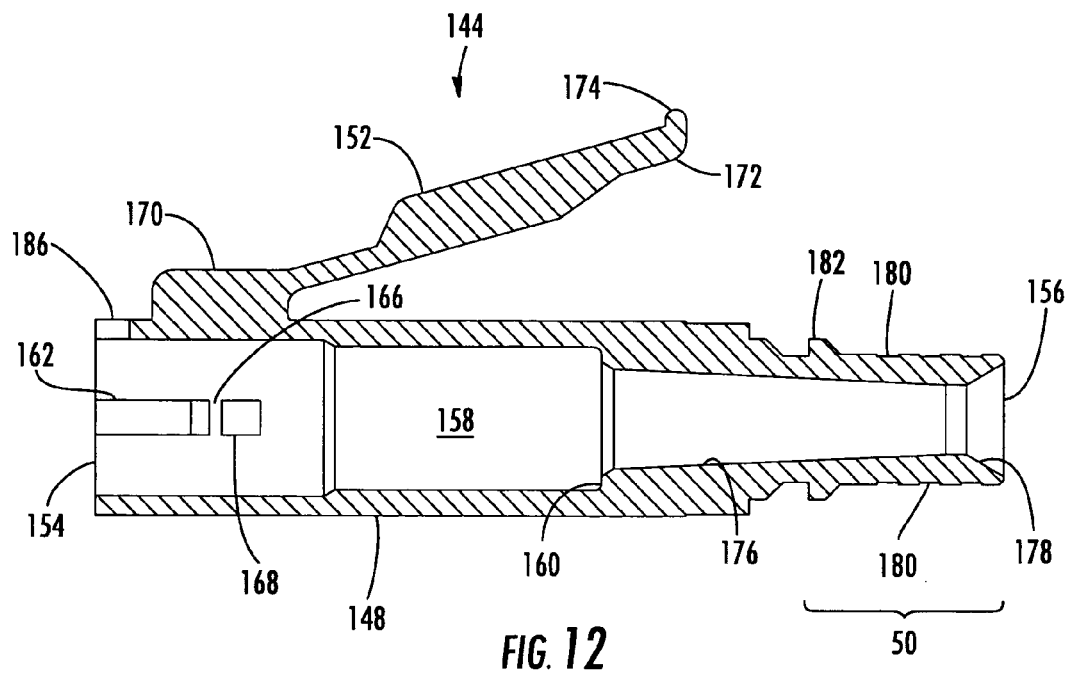
FIG. 12 is a longitudinal cross sectional view of another housing according to an embodiment of the present invention.

Housing 144 according to the present embodiment is shown in longitudinal cross section in FIG. 12, and is characterized by housing body 148, housing tailpiece 150 and latching arm 152. As before, housing 144 is formed in a single piece, for example, by injection molding, and may be comprised of plastic or other suitable moldable material. Housing 144 includes first end 154, second end 156, and passage 158 extending therebetween.

Housing passage 158 preferably also contains shoulder 160 located at an intermediate position within the passage. Shoulder 160 serves as a seat for seating and positioning spring element 46 within housing passage 158. Housing 144 may also include at least one channel 162 extending longitudinally along an inside surface thereof and along at least a portion of passage 158 proximate first end 154 to accommodate at least one retainer latching element 164 (FIG. 11) which may be used to secure retainer 146 within the housing. Latching element 164 slides within channel 162 as retainer 146 is inserted into housing passage 158 through first end 154. As retainer 146 is inserted into passage 158, latching element 164 snaps over latch ridge 166 and thereafter engages with and is captured by latch opening 168 in housing body 148. Preferably, there are at least two latching elements on retainer 146 located on opposing sides of retainer 146, and two corresponding latch openings 168 in housing body 148.

Both housing latching arm 152 and housing tailpiece 150 are substantially the same as previously described. Latching arm 152 comprises proximal end 170 attached to housing body 148 and a cantilevered distal end 172 which projects from housing body 148. Latching arm 152 also includes latching lugs 174 (FIG. 13) for securing housing 144 within an adapter (for mating the connector to another connector), or to a fiber optic module. Preferably, latching lugs 174 extend outward from latching arm 152 at an intermediate position between proximal end 170 and distal end 172. Latching arm distal end 172 preferably includes latching arm lip 174 for cooperating with trigger member 54. Latching arm 152 is sufficiently resilient that the latching arm may be depressed, thereby deflecting distal end 172 toward housing body 148. When latching arm 152 is released from a depressed position, latching arm 152 preferably returns to its previous, un-depressed position.

Housing tailpiece 150 extends rearward from housing body 148 toward housing second end 156. Housing tailpiece 150 is preferably cylindrical, and that portion of housing passage 158 extending through tailpiece 150 is sized to receive lead-in tube 44. Preferably, at least a portion 176 of passage 158 which extends through tailpiece 150 is tapered so as to facilitate insertion of lead-in tube 44 without damage to the lead-in tube. A chamfer 178 about the inside circumference of passage 158 at tailpiece second end 156 may be included to accommodate a flare at one end of lead-in tube 44.

Housing tailpiece 150 may further include surface gripping features, such as grooves 180, for retaining strength members of an optical cable, such as arimid yarns. As previously described, in the event connector 142 is to be attached to an optical fiber contained within a cable structure comprising appropriate strength members, the strength members may be exposed by removing a portion of the cable jacket. The strength members are then placed over the gripping features of housing tailpiece 150 and a clamping element, such as crimp ring 50, is crimped about housing tailpiece 150, thereby capturing the strength members between the tailpiece and the clamping element. Tailpiece 150 may also comprise ridge 182 for retaining boot 52. When boot 52 is mounted on housing 144, such as by inserting tailpiece 150 into boot 52, ridge 182 preferably mates with a corresponding groove in boot 52, thereby securing boot 52 onto housing 144.

Figure 13:
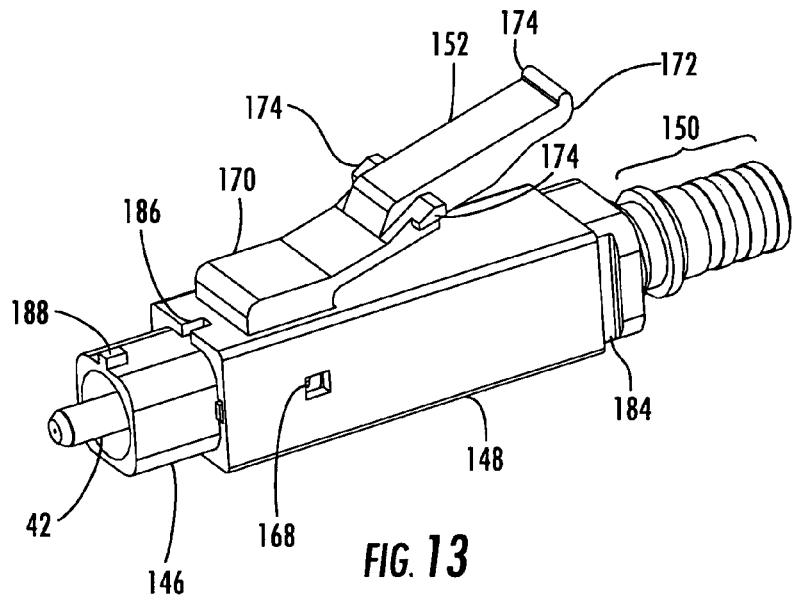
FIG. 13 is a perspective view of the housing of FIG. 12.

Housing body 148 may preferably also comprise recesses 184, best shown in FIG. 13, located proximate tailpiece 150 for engaging with optional trigger member 54 in a manner as previously described.

In the present embodiment, housing 144 further includes an alignment feature, such as keyway 186 located at first end 154 for slidably engaging with a corresponding alignment feature, such as key 188 located on retainer 146. The corresponding relationship between keyway 186 and key 188 is depicted in FIG. 13, where keyway 186 and key 188 are shown in alignment prior to full insertion of retainer 146 into passage 158.

Figure 14:
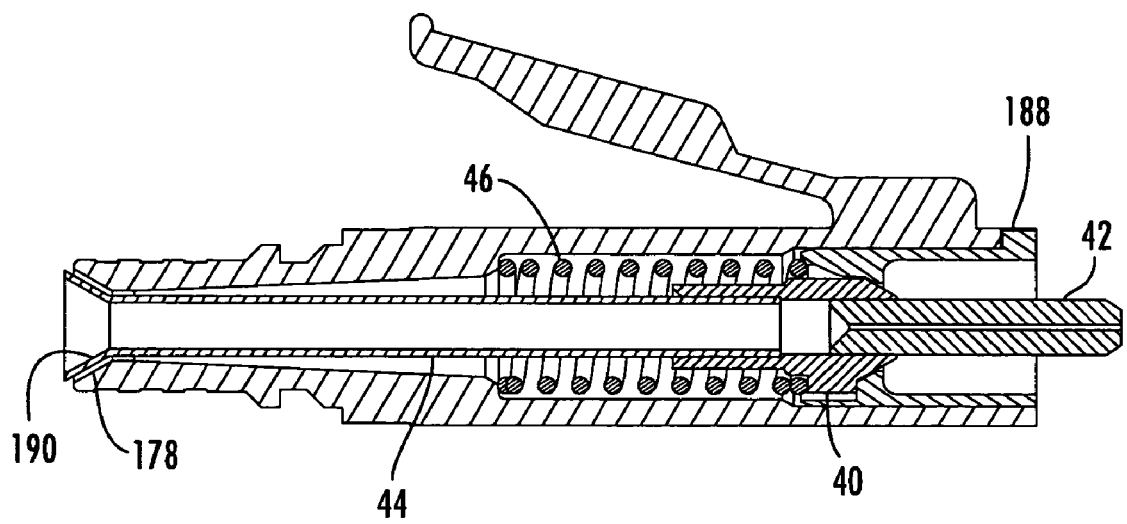
FIG. 14 is a longitudinal cross sectional view of the optical fiber connector of FIG. 11.

As in the previous embodiment and as shown in FIG. 14, lead-in tube 44, may be formed with flare 190 after insertion of the lead-in tube into housing 144. FIG. 14 shows a longitudinal cross section of connector 142 after assembly (but without crimp ring 50, boot 52 and trigger member 54), with lead-in tube 44 having flare 190 formed at one end thereof. Flare 190 advantageously facilitates insertion of an optical fiber into lead-in tube 44 when mounting connector 142 onto an optical fiber. Flare 190 is accommodated by chamfer 178 in passage 158 at housing second end 156. It should be noted that the position of key 188 and keyway 186 could be reversed, with key 188 located on housing 144 and keyway 186 located on retainer 146.

Figure 17:
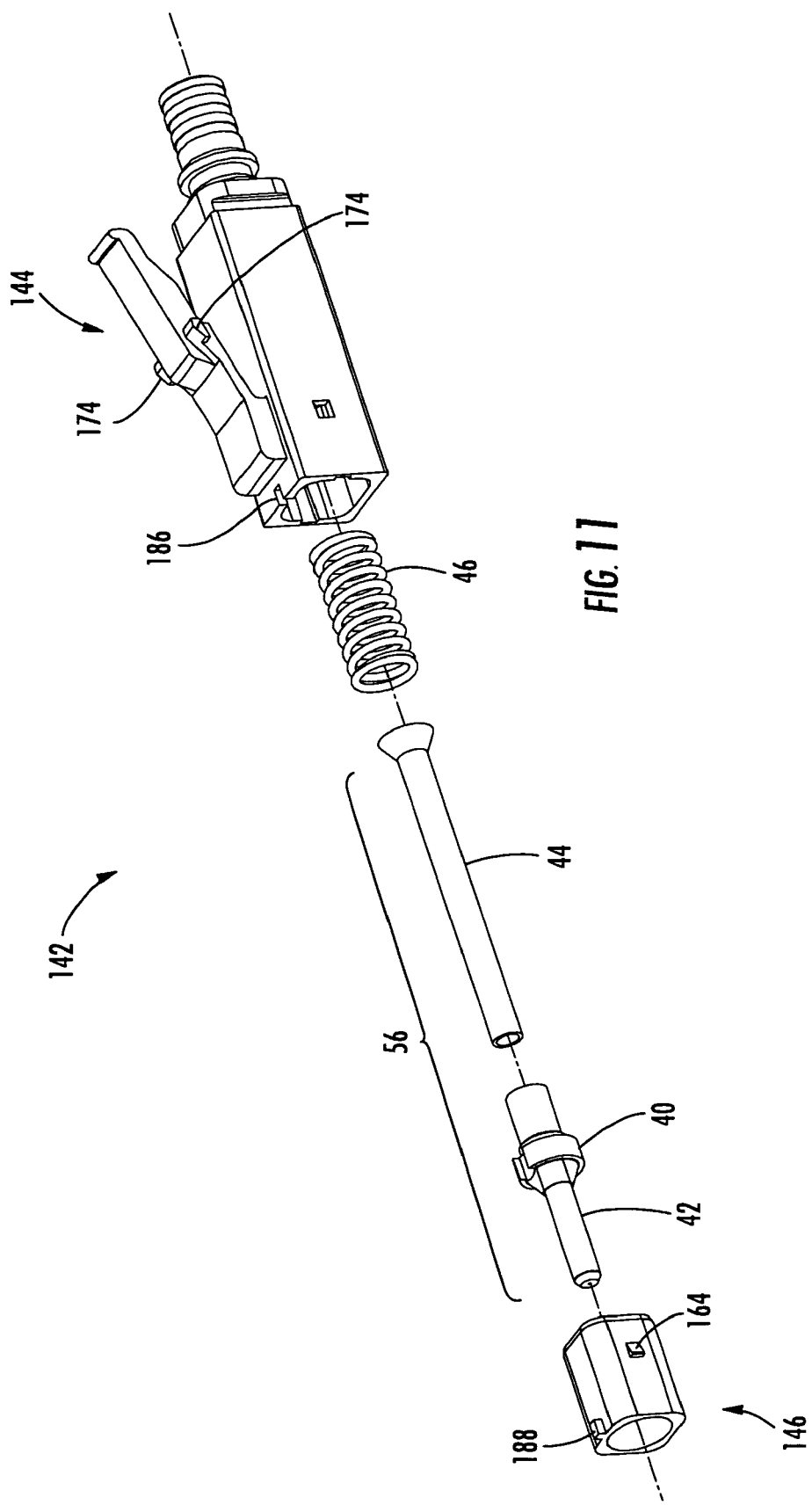
FIG. 17 is a rear view of the retainer of FIG. 15.

As depicted in FIGS. 15-17, retainer 146 comprises first end 192, second end 194 and a passage 196 extending therebetween. Stop element 198 extends radially into retainer passage 196, and facilitates alignment of ferrule holder 40 within retainer passage 196. In a manner similar to the previous embodiment, the rearward face of stop element 198 preferably includes a sloped or tapered portion 200 for abutting with and centering conical portion 102 of ferrule holder 40. When connector 142 has been assembled, forward end 192 of retainer 146 is preferably substantially flush with housing forward end 154. Key 202 extends radially into retainer passage 196 and is sized such that keyway 106 located in ferrule holder flange 104 slidably receives key 202, thus orienting ferrule holder 40 within retainer passage 196. As in the previous embodiment, connector 142 may also include boot 52 and trigger member 54, which may be mounted on housing 144 over boot 52 in a manner identical to the method of mounting described for the previous embodiment.

Figure 18:
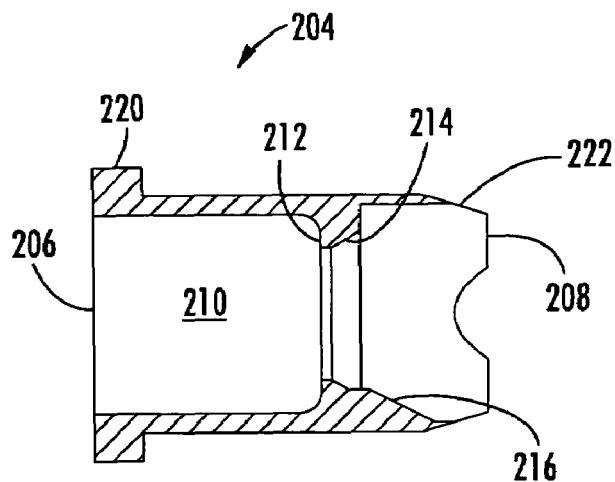
FIG. 18 is a longitudinal cross sectional view of still another embodiment of a retainer according to the present invention.
Figure 19:
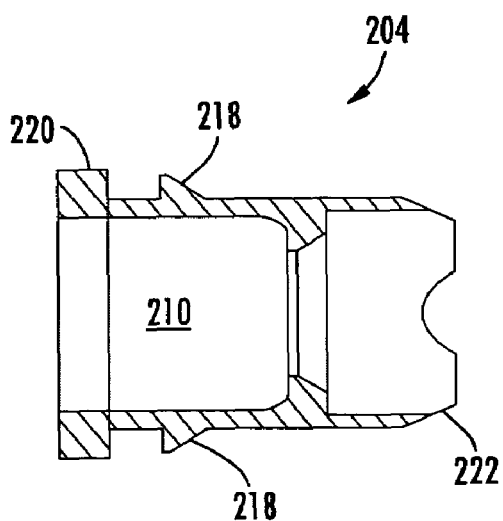
FIG. 19 is another longitudinal cross sectional view of the retainer of FIG. 18.
Figure 20:
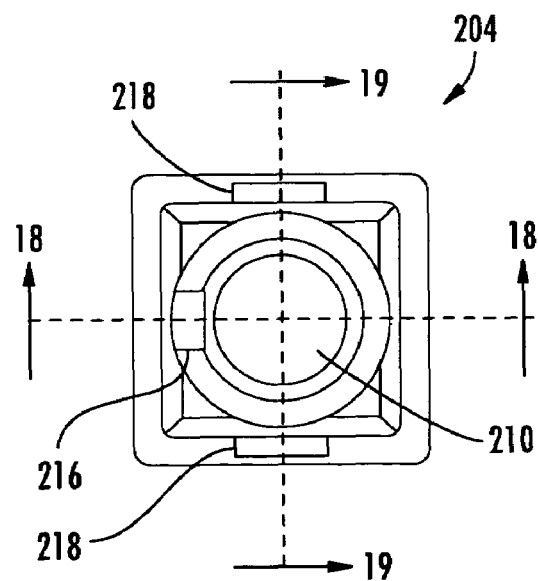
FIG. 20 is a rear view of the retainer of FIG. 18.

In still another embodiment similar to the first embodiment, retainer 46, which is inserted completely within housing 38, is replaced by retainer 204, depicted in FIGS. 18-20. Retainer 204 comprises forward first end 206, rearward second end 208 and passage 210 extending longitudinally therebetween. As in a previous embodiment, retainer 204 includes stop element 212 extending into passage 210 for preventing ferrule holder 40 from passing completely through passage 210, thus spring element 46 biases ferrule holder 40 against stop 212. The rearward face of stop element 212 preferably includes sloped portion 214 to encourage centering of ferrule holder 40 within retainer 204. When the connector has been assembled, spring element 46 biases ferrule holder 40 into abutment with stop element 212 with a predetermined spring force. The predetermined spring force is preferably greater than about 1 lb.; more preferably between about 1 lb. and 1.5 lbs.; and most preferably between about 1.1 lb. and 1.4 lbs.

Key 216 extends radially into retainer passage 210 and slidably engages with slot or keyway 106 in ferrule holder flange 104, thereby aligning ferrule holder 40 in retainer 204 and preventing subsequent rotation of ferrule holder 40 in the assembled connector. As shown in FIGS. 19-20, retainer 204 includes latching elements 218 for engaging with housing latch openings 76 and further includes flange 220. Retainer 204 is inserted into housing passage 68 through housing first end 64 until flange 220 abuts the housing first end. As shown in FIG. 18-19, an outside portion 222 of retainer 204 proximate second end 208 may be sloped, or angled, to make insertion into housing passage 68 easier.

Figure 21:
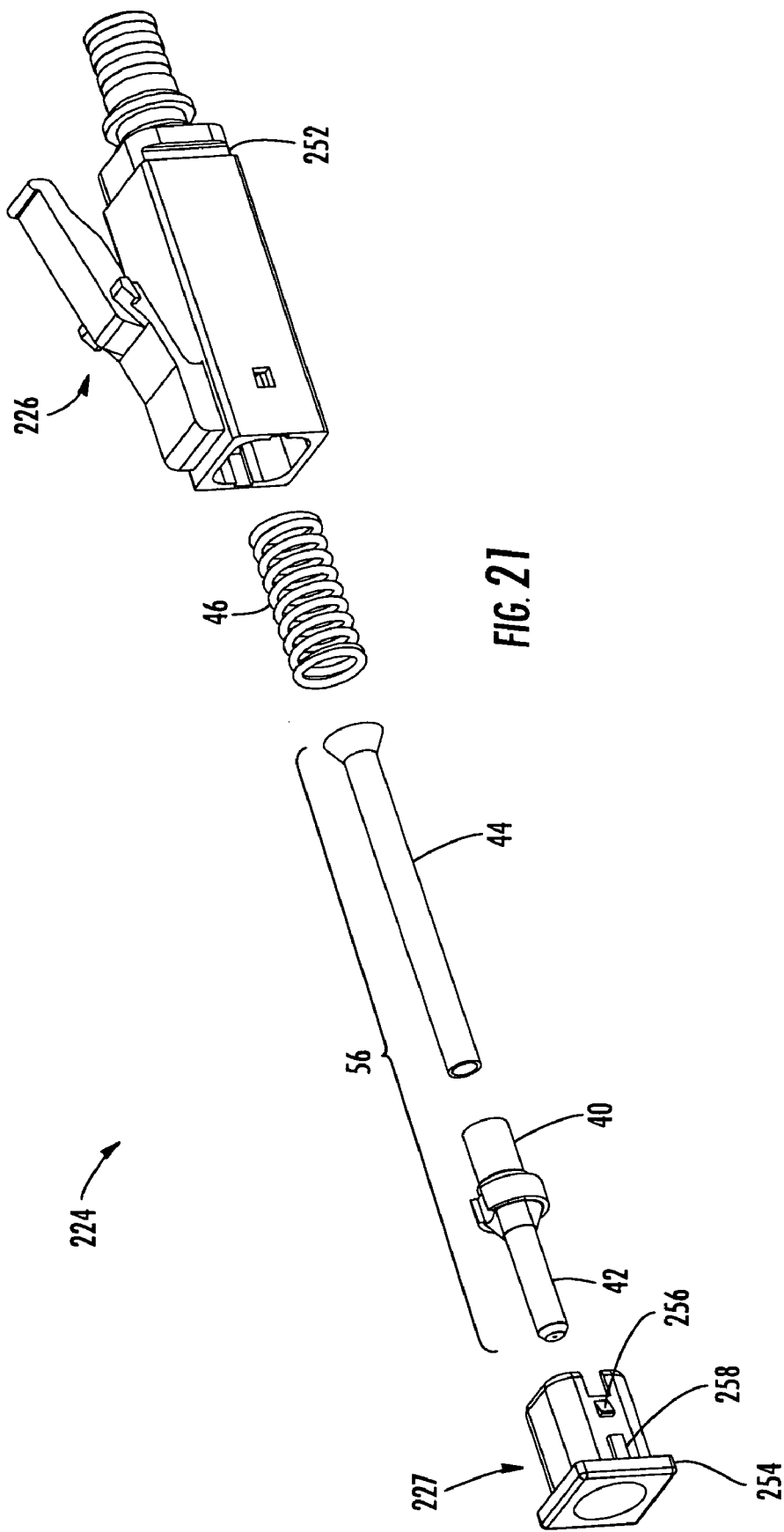
FIG. 21 is a partially exploded view of another embodiment of an optical fiber connector according to the present invention.

FIG. 21 illustrates yet another embodiment of a connector according to the present invention. As shown in FIG. 21, connector 224 is substantially as previously described in that connector 224 comprises housing 226, subassembly 56 comprising ferrule holder 40, ferrule 42 and lead-in tube 44, and spring element 46. Connector 224 further includes retainer 227 and may also include crimp ring 50, boot 52 and trigger element 54, as previously described.

Figure 22:
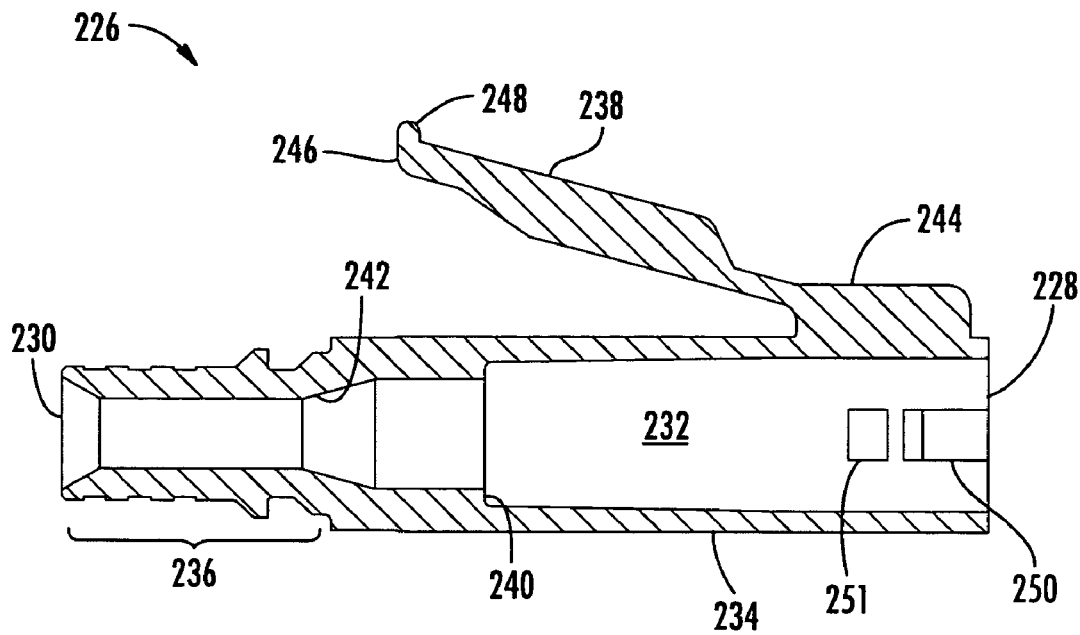
FIG. 22 is a longitudinal cross sectional view of another embodiment of an optical fiber connector housing according to the present invention.

According to the present embodiment, and as shown in FIG. 22, housing 226 is similar to previous embodiments and comprises first end 228, second end 230 and a passage 232 extending longitudinally therebetween. Housing 226 is characterized by housing body 234, housing tailpiece 236 and latching arm 238. Preferably housing 226 is one piece, and is molded from a suitable plastic such as by injection molding. Shoulder 240 is located at an intermediate position within housing passage 232 and serves as a seat for spring element 46. As in the previous embodiments, housing tailpiece 236 may include suitable surface features, such as grooves ridges or dimples, for retaining strength members, and a ridge for retaining boot 52. At least a portion 242 of passage 232 is preferably tapered to facilitate insertion of lead-in tube 44 without damaging the lead-in tube. Passage 232 is preferably chamfered at second end 230 for accommodating a flare at the end of lead-in tube 44. Latching arm 238 includes proximate end 244 attached to housing body 234 and a cantilevered distal end 246. Latching arm 238 may also include lip 248 at the distal end of the latching arm for cooperating with trigger member 54. Housing 226 also comprises channels 250 for slidably receiving latching elements 256 located on retainer 227, and latch openings 251 for engaging with and capturing the retainer latching elements. Recesses 252 on housing 226, best seen in FIG. 23, may engage with trigger member 54 in a manner as previously described.

Figure 23:
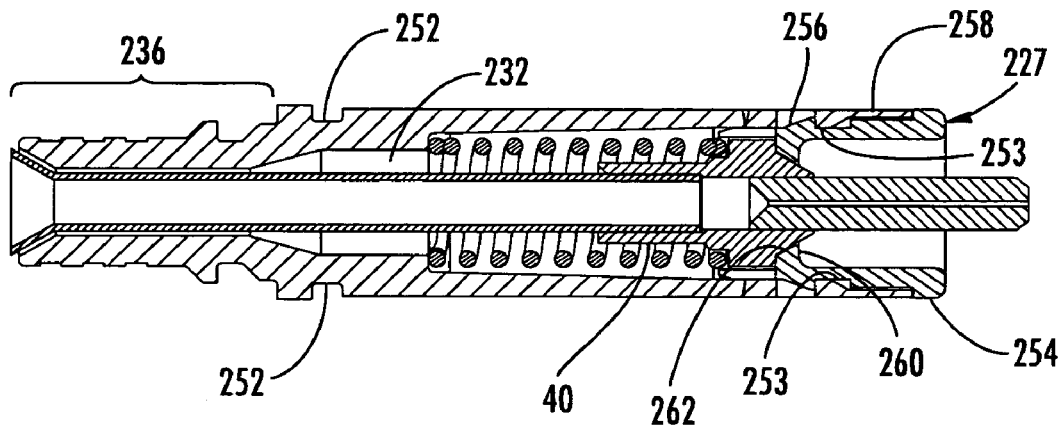
FIG. 23 is a longitudinal cross sectional view of the connector of FIG. 21, seen from the top.

Returning to FIG. 21, retainer 227 comprises flange 254, latching elements 256 and an alignment feature, such as key 258, for orienting and aligning retainer 227 within and relative to housing 226. For example, key 258 may be larger (wider) than retainer latching elements 256, and one housing channel 250 sized to accommodate key 258. Thus key 258 would fit within passage 232 in only a single orientation. FIG. 23 depicts a longitudinal cross section of connector 224 without crimp ring 50, boot 52 and trigger member 54. Retainer 227 also comprises stop element 260 extending radially into passage 232. Stop element 260 preferably includes sloped portion 262 for abutting with sloped portion 102 of ferrule holder 40, thereby assisting in alignment of ferrule holder 40 relative to retainer 227.

Figure 24:
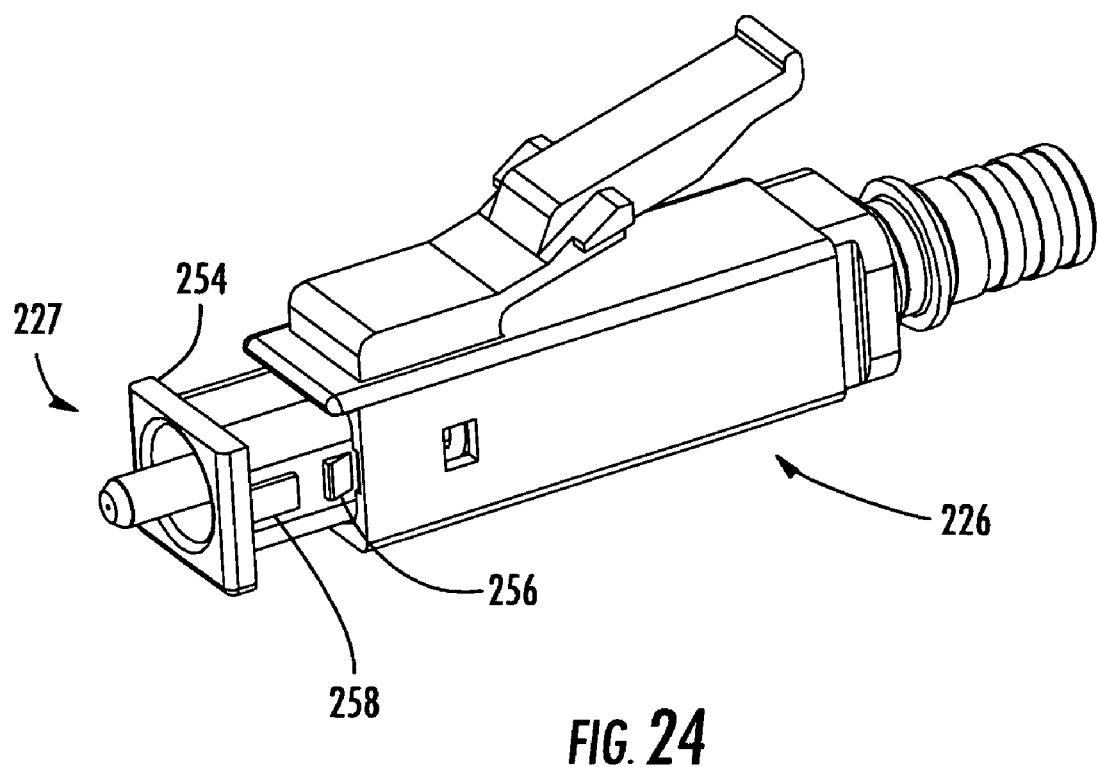
FIG. 24 is a perspective view of the optical fiber connector of FIG. 21, partially assembled.

To assemble connector 224, spring element 46 is inserted into housing passage 232 through housing first end 228. Thereafter, subassembly 56 is inserted such that lead-in tube 44 is disposed within housing tailpiece 236. Retainer 227 is inserted into housing passage 232 through housing first end 228 until retainer portion 262 abuts ferrule holder 40, retainer 227 being oriented such that retainer latching elements 256 and retainer alignment key 258 are aligned with channels 250. Retainer 227 is then pressed rearward into passage 232, compressing spring element 46 until retainer latching elements 256 snap over snap ridges 253 and engage with housing latch openings 251. Once connector 224 has been assembled, lead-in tube 44 may thereafter be flared. A perspective view of connector 224 is illustrated in FIG. 24 and shows retainer 227 partially inserted into housing 226.

Also as previously described, connector 224 may be mounted on a coated optical fiber. In the event the optical fiber is contained within and optical fiber cable, a length of the cable covering, or jacket is removed, thereby exposing at least one optical fiber contained therein and any strength members which may be present and associated with the optical fiber. A length of the optical fiber coating is removed by any of the methods known in the art. An adhesive, such as an epoxy adhesive, may be injected into ferrule 42 through lead-in tube 44, such as with a syringe, and the optical fiber thereafter inserted through the lead-in tube into ferrule 42. A clamping element, such as crimp ring 50 is used to clamp the strength members between the clamping element and the tailpiece 236, the tailpiece thus functioning as an attachment member. Boot 52, which has been previously mounted over the coated optical fiber, is then slid forward until the boot is secured about housing tailpiece 236. Optional trigger member 54 may then be attached to the connector by snapping the trigger member over boot 52 and engaging snap members 126 with recesses 252.

Figure 25:
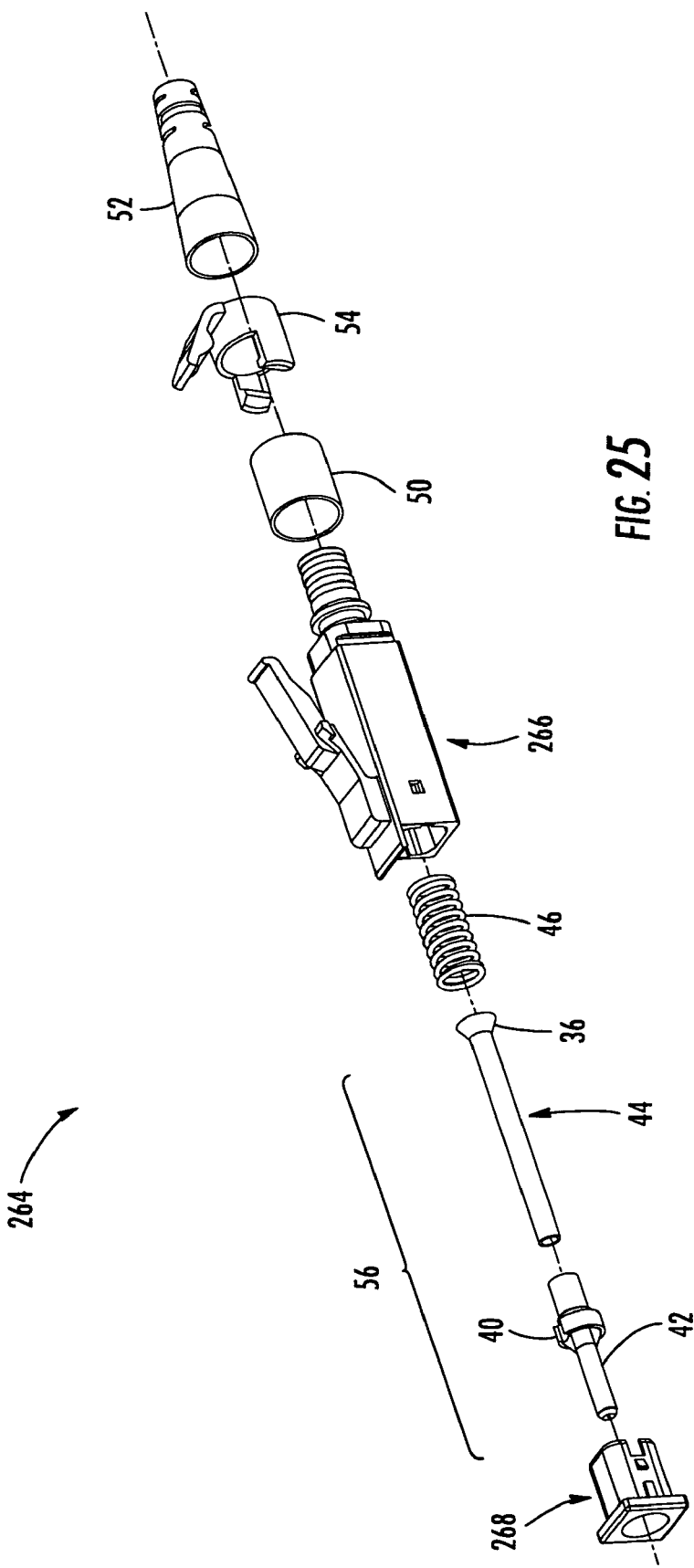
FIG. 25 is a partially exploded view of yet another embodiment of an optical fiber connector according to the present invention.

In a preferred embodiment shown in FIG. 25, connector 264 includes housing 266, spring element 46, subassembly 56 and retainer 268. Connector 264 may further include crimp ring 50, boot 52 and trigger member 54, as previously described.

Figure 26:
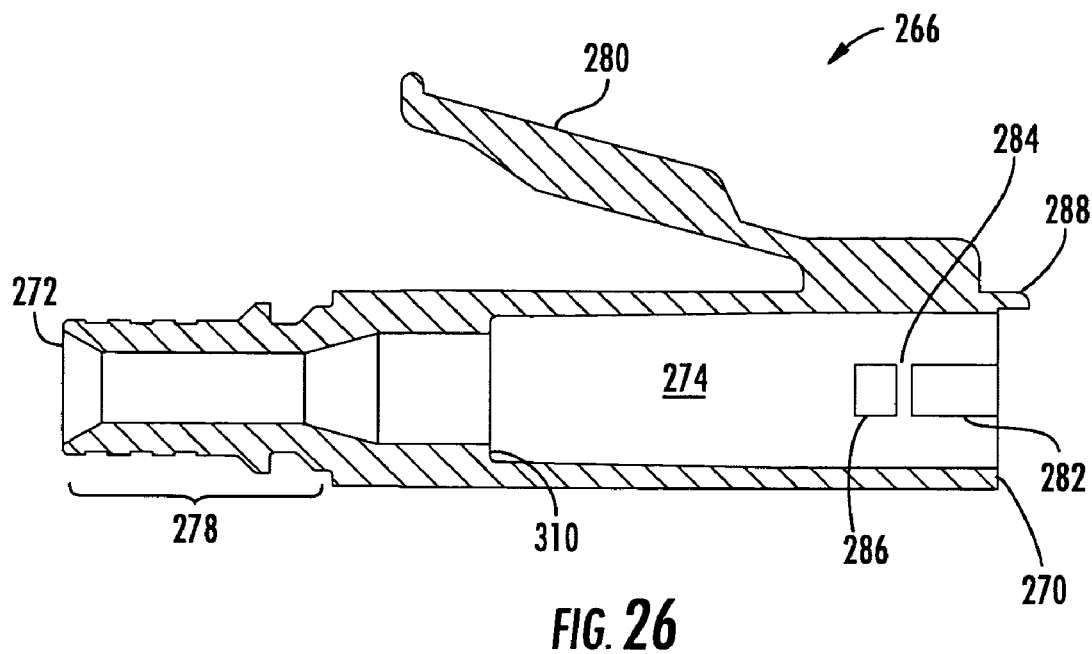
FIG. 26 is a longitudinal cross sectional view of an embodiment of an optical fiber connector housing according to the present invention.

Housing 266, shown in FIG. 26, comprises first end 270, second end 272 and passage 274 extending longitudinally therebetween. As previously described, housing 266 includes a housing body having a tailpiece 278 and a latching arm 280. The housing tailpiece 278 and latching arm 280 are substantially as previously described and will not be described further. Housing 266 also includes channels 282, snap ridges 284 and latch openings 286. Snap ridges 284 have substantially similar form and function as snap ridges 77, 166 and 253 previously described. Snap ridges 77, 166, 253 and 284 may have squared edges, as shown for snap ridges 253, or they may have one or more chamfered edges. An alignment feature for aligning retainer 268 with housing 266, such as brow or lip 288, is located at housing first end 270.

Figure 27:
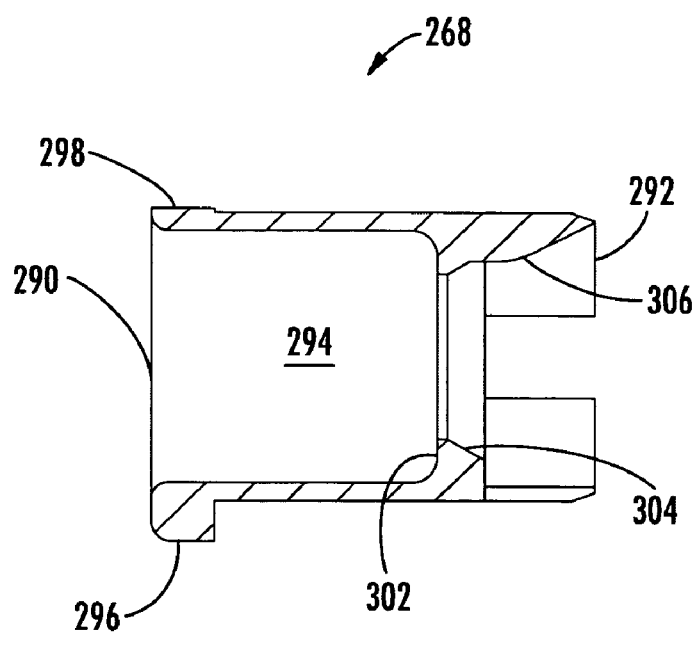
FIG. 27 is a longitudinal cross sectional view of another embodiment of a retainer according to the present invention.
Figure 28:
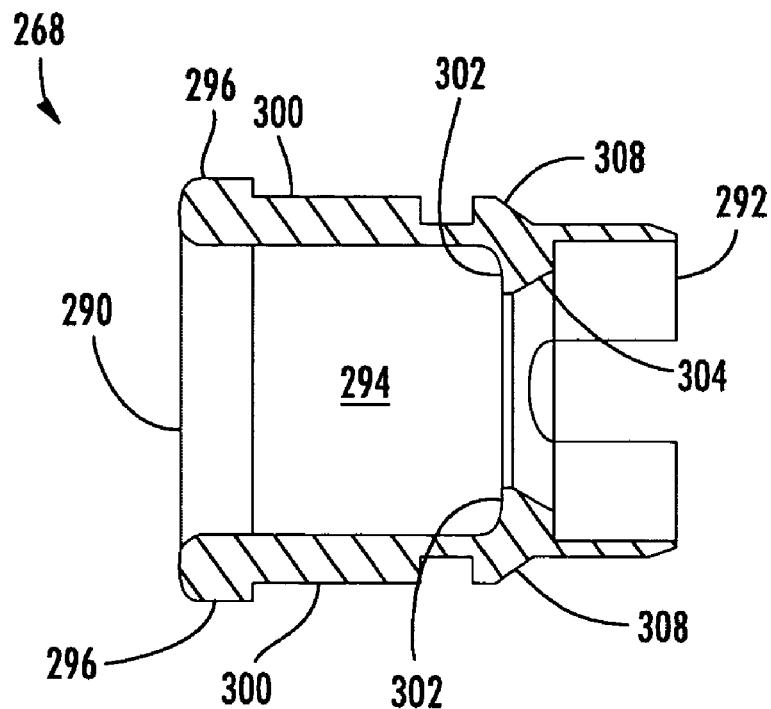
FIG. 28 is another longitudinal cross sectional view of the retainer of FIG. 27.
Figure 29:
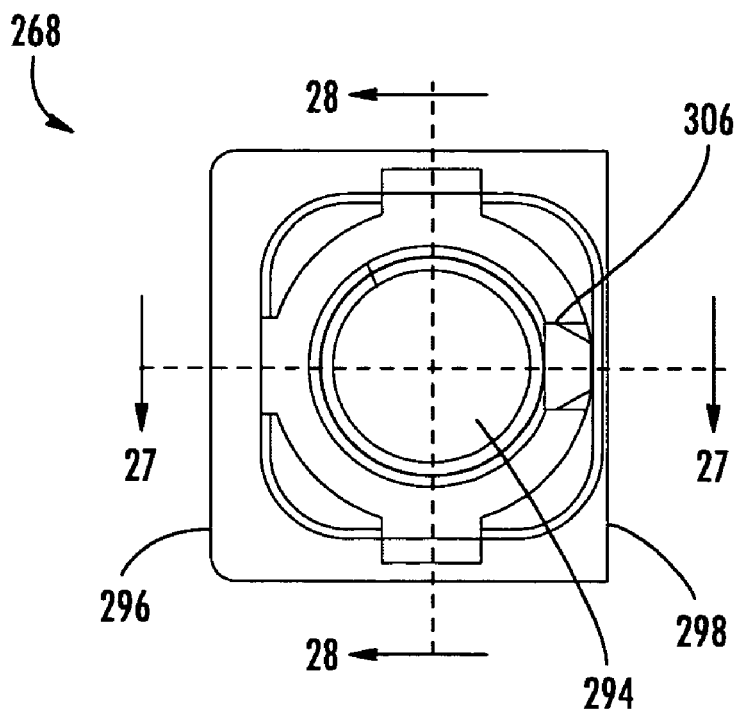
FIG. 29 is a rear view of the retainer of FIG. 27.

As illustrated in FIGS. 27-29, retainer 268 includes first end 290, second end 292 and passage 294 extending longitudinally therebetween. Flange 296 is located at first end 290 of the retainer. Retainer 268 further comprises an alignment feature for ensuring that retainer 268 is correctly oriented relative to housing 266 when retainer 268 is inserted into housing passage 274. For example, as shown in FIG. 27, the alignment feature is created by shortening, or altogether eliminating, a portion of flange 296, thereby forming a flattened region 298 on retainer 268 which cooperates with housing lip 288. As retainer 268 is inserted into housing passage 274 through housing first end 270, the alignment feature (e.g. truncated flange portion 298) is aligned with housing lip 288. When retainer 268 has been fully inserted into housing 266, housing lip 288 extends over truncated flange portion 298. Retainer 268 is prevented from being fully inserted into housing passage 274 in other orientations by the extended portions of flange 296. It will be appreciated that the cooperating alignment features need not comprise a flat, linear lip and truncated flange portion as depicted in FIGS. 26-27, but may include other complimentary shapes which properly orient retainer 268 relative to housing 266. For example, the surface of lip 288 immediately adjacent retainer alignment feature 298 could have a concave or convex shape, and retainer alignment feature 298 have a complimentary shape. Retainer 268 may also include at least one alignment key 300, as previously described. Preferably, retainer 268 comprises at least two alignment keys 300. Alignment keys 300 may be the same size, or keys 300 may be different sizes.

Retainer 268 also preferably comprises stop element 302 extending radially into retainer passage 294. Stop element 302 preferably includes a sloped portion 304 for cooperating with ferrule holder conical portion 102, thereby encouraging alignment of the ferrule holder 40 within the retainer passage 294. As in previous embodiments, key 306 extends radially into retainer passage 294 and slidably engages with ferrule holder keyway 106 to orient ferrule holder 40 relative to retainer 268. Retainer 268 further includes latching elements 308 (FIG. 28) for engaging with housing latch openings 286.

Connector 264 may be assembled in the following manner: Spring element 46 is inserted into passage 274 through housing first end 270 and into abutment with housing shoulder 310. Ferrule 42 is inserted through ferrule holder first end 94 into passage 98 and secured, such as with an adhesive. Lead-in tube 44 is inserted into ferrule holder passage 98 through ferrule holder second end 96, preferably into abutment with shoulder 100 in ferrule holder passage 98. Subassembly 56, comprising ferrule holder 40, ferrule 42 and lead-in tube 44, is mounted in housing 266 by inserting the subassembly into housing passage 274 through housing first end 270 such that lead-in tube 44 passes through a central region of spring element 46 and lead-in tube 44 enters housing tailpiece 278.

Figure 30:
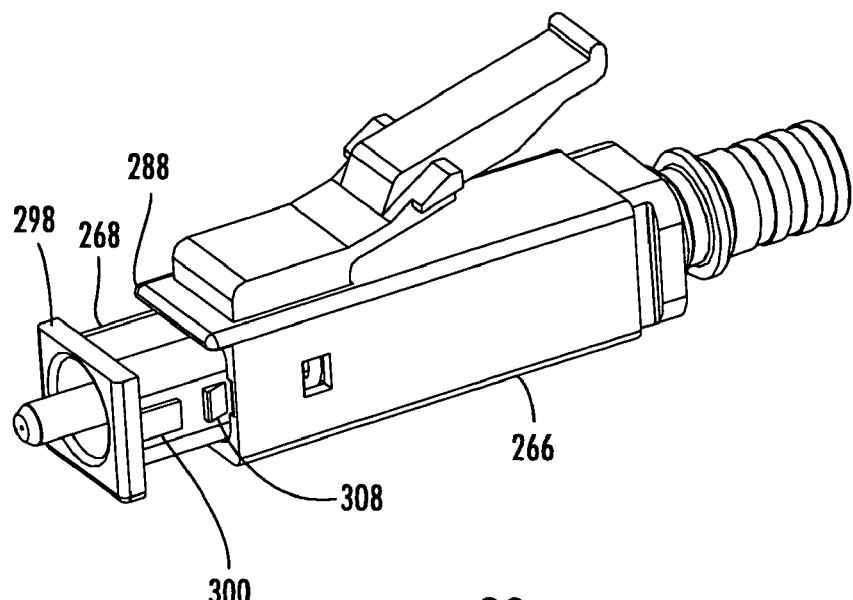
FIG. 30 is a perspective view of the optical fiber connector of FIG. 25, partially assembled.
Figure 31:
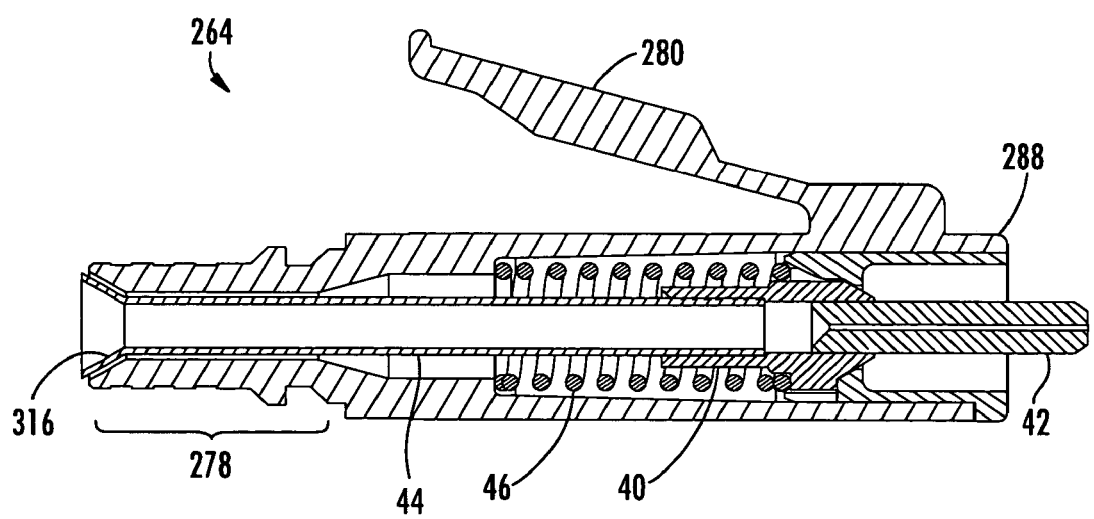
FIG. 31 is a longitudinal cross section view of the optical fiber connector of FIG. 25, assembled.

Once subassembly 56 has been mounted within housing 266, as illustrated in FIG. 30, retainer 268 is inserted into housing passage 274 through housing first end 270 until ferrule holder conical portion 102 abuts stop element 302 within retainer passage 294. Retainer 268 is orientated, such as by rotation, until retainer alignment feature 298 is aligned with housing lip 288. At the same time, retainer latching elements 308 and alignment keys 300 slidably engage with channels 282 in housing passage 274. Retainer 268 is pushed rearward into housing passage 274, compressing spring element 46 until retainer latching elements 308 snap over ridges 284 and engage with housing openings 286, placing subassembly 56 in a floating relationship with housing 266. Spring element 46 biases ferrule holder 40 against retainer 268 with a predetermined spring force. The predetermined spring force is preferably greater than about 1 lb.; more preferably between about 1 lb. and 1.5 lbs.; and most preferably between about 1.1 lb. and 1.4 lbs. It should be noted that retainer 268 may be secured within housing passage 274 by other means as are known in the art, such as by a friction fit, or through the use of adhesives, such as an epoxy adhesive. That portion of lead-in tube 44 at housing second end 272 may thereafter be flared by methods which are known to the skilled artisan, such has by inserting a heated form into the bore of lead-in tube 44 and enlarging a portion of the lead-in tube to form flare 316. The connector 264 may then be mounted onto an optical fiber, and boot 52 and trigger member 54 thereafter mounted as previously described. A longitudinal cross sectional view of assembled connector 264 is illustrated in FIG. 31.

It will be apparent to those skilled in the art that various other modifications and variations can be made to the present invention without departing from the spirit and scope of the invention. Thus it is intended that the present invention cover any and all modifications and variations of this invention provided that fall within the scope of the appended claims and their equivalents.

That which is claimed is:

1. A method for assembling an optical fiber connector, comprising:
    providing a one piece housing comprising a tailpiece and a body defining a forward first end, a rearward second end and a passage extending longitudinally therebetween;
    inserting a spring element into the passage through the forward first end;
    inserting a subassembly comprising a ferrule, a ferrule holder and a lead-in tube into the passage through the forward first end;
    maintaining the spring within the passage between a shoulder defined by the one piece housing and a flange of the ferrule holder; and
    inserting a subassembly retainer into the passage through the forward first end.

2. The method according to claim 1, further comprising attaching a trigger member about the tailpiece portion of the one piece housing.

3. The method according to claim 1, further comprising aligning the subassembly retainer relative to the one piece housing using an alignment element.

4. The method according to claim 3, wherein the alignment element comprises at least one of a keyway, a key and a lip.

5. The method according to claim 1, wherein the one piece housing comprises a latching arm.

6. The method according to claim 1, wherein the subassembly retainer comprises latch elements for securing the subassembly retainer within the one piece housing.

7. The method according to claim 1, further comprising slidably receiving a latching element provided on the subassembly retainer within the passage.

8. A method of assembling an optical fiber connector, comprising: providing a one piece housing comprising a forward first end, a rearward second, a housing passage through the housing, a shoulder within the passage, and a tailpiece;
    inserting a spring element into the housing passage through the forward first end and into abutment with the shoulder;
    assembling a subassembly by inserting a ferrule into a ferrule holder passage, inserting a lead-in tube into the ferrule holder passage, and pressing the lead-in tube into abutment with a shoulder in the ferrule holder passage;
    inserting the subassembly into the housing passage through the forward first end such that the lead-in tube passes through a central region of the spring element and the tailpiece;
    inserting a subassembly retainer into the housing passage through the forward first end.

9. The method according to claim 8, further comprising orienting the subassembly retainer such that retainer latching elements slidably engage with channels in the housing passage.

10. The method according to claim 9, further comprising pushing the subassembly retainer rearward into the housing passage thereby causing a ferrule holder flange to compress the spring element until the retainer latching elements snap over ridges and engage with housing latch openings, thereby placing the subassembly in a floating relationship with the one piece housing.

11. The method according to claim 10, further comprising compressing the spring element between the housing shoulder and the ferrule holder flange, and biasing the ferrule holder against the retainer subassembly.

12. The method according to claim 10, wherein a biasing force is greater than 1.0 lb.

13. The method according to claim 8, further comprising attaching a trigger member over the tailpiece and to the rearward second end of the one piece housing.

14. An optical fiber connector assembled by providing a one piece housing comprising a tailpiece and a body defining a forward first end, a rearward second end and a passage extending longitudinally therebetween, inserting a spring element into the passage through the forward first end, inserting a subassembly comprising a ferrule, a ferrule holder and a lead-in tube into the passage through the forward first end, maintaining the spring within the passage between a shoulder defined by the one piece housing and a flange of the ferrule holder, and inserting a subassembly retainer into the passage through the forward first end.

* * * * *